Feb. 20, 1951 B. E. STONE 2,542,590
TAPE RUNOUT CONTROL FOR MAGNETIC RECORDERS
Filed Jan. 7, 1950 2 Sheets-Sheet 1
Fig. 1.
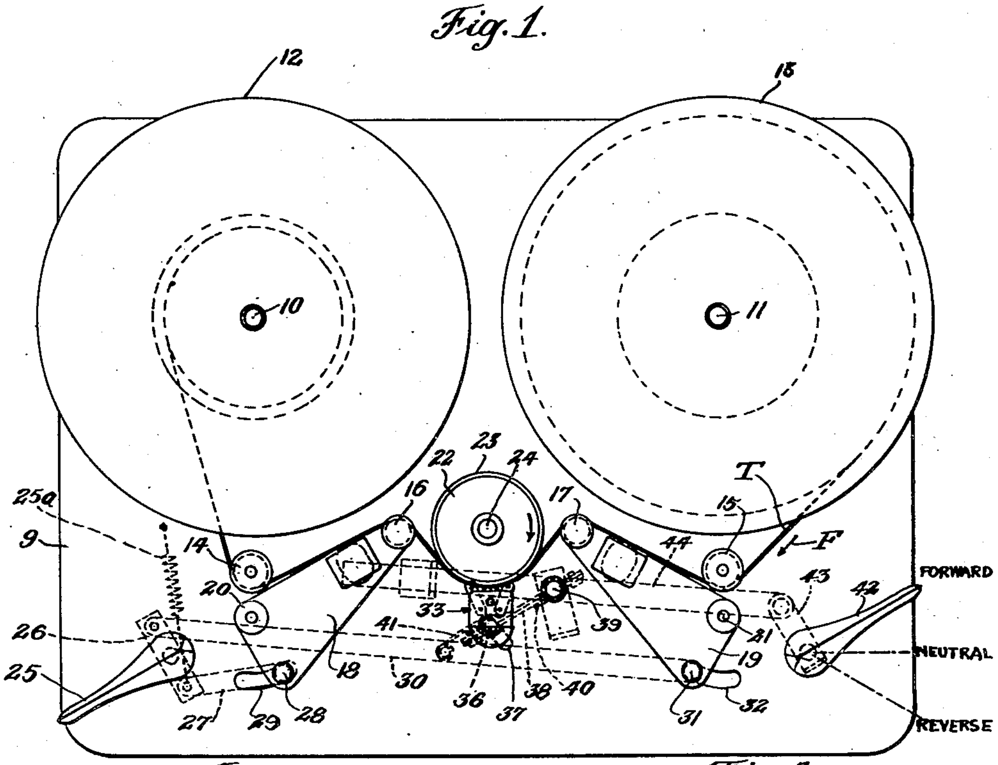
Fig. 2. Fig. 3. Fig. 4.
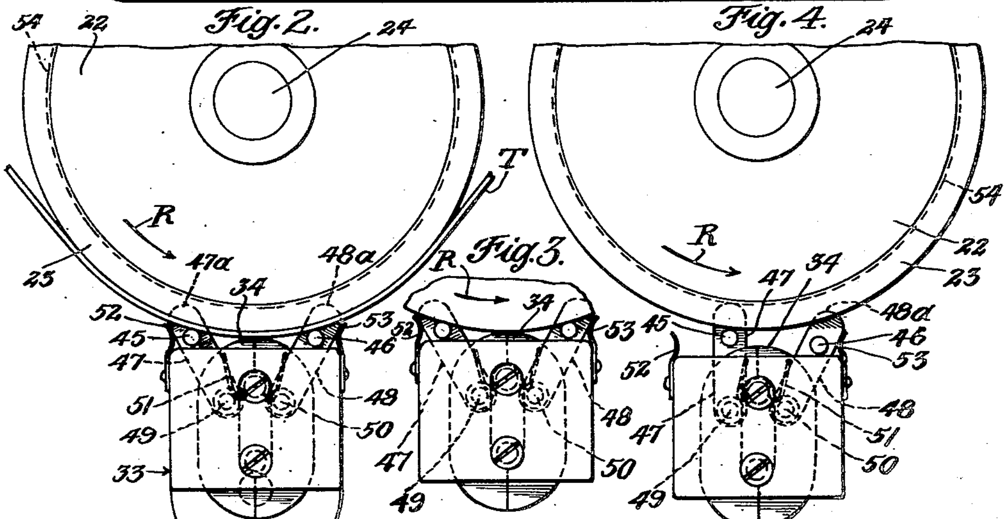
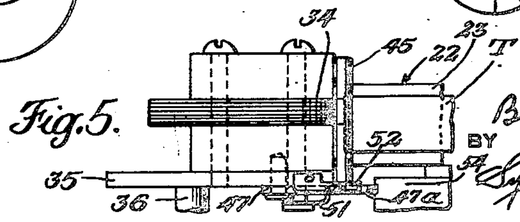
INVENTOR
Burnham E. Stone
BY
Seymour & Lehman
ATTORNEYS

TAPE RUNOUT CONTROL FOR MAGNETIC RECORDERS

Filed Jan. 7, 1950 2 Sheets-Sheet 2

INVENTOR
Burnham E. Stone
BY
[signature]
ATTORNEYS

Patented Feb. 20, 1951

2,542,590

UNITED STATES PATENT OFFICE 2,542,590

TAPE RUNOUT CONTROL FOR MAGNETIC RECORDERS

Burnham E. Stone, Philadelphia, Pa., assignor to International Electronics Company, Philadelphia, Pa., a corporation of Pennsylvania Application January 7, 1950, Serial No. 137,363

16 Claims. (Cl. 179—100.2)

This invention relates to equipment for use with magnetic records, especially in the form of elongated tape carrying dispersed magnetizable particles. The invention, moreover, is especially concerned with that type of mechanism incorporating a rotative tape driving member such as a capstan, and further incorporating a scanning device or head adapted to scan the record while it is riding on the capstan.

Machines of the general character referred to just above are feully disclosed in the copending application of Frank J. Reed, Serial No. 742,776, filed April 21, 1947; in the copending application of Daniel H. Dashiell and Lloyd J. Bobb, Serial No. 11,995, filed February 28, 1948, and also in the copending application of Chester C. Pond, Serial No. 103,352, filed July 7, 1949.

As disclosed in said applications a machine of the general kind above referred to includes a tape driving capstan adapted to feed the tape between a pair of tape reels, the capstan drive, in a typical machine, being reversible so as to provide for feed and scanning of the tape in either direction. The capstan is advantageously surfaced with some friction material, for instance rubber in order to provide a high coefficient of friction between the capstan and the tape and thereby ensure stability of tape feed. In machines of this kind, moreover, a magnetic scanning head, used for both recording and playback is positioned to scan the tape while it is riding on the capstan. The head mounting is arranged to permit the head to swing toward and away from the capstan and a spring is used which normally urges the head with a light pressure against the tape riding on the capstan. The head is also mounted for shifting movement edgewise of the tape so that different tracks may be scanned on the tape during forward and reverse feed thereof.

In a machine of the character briefly outlined above, in the event of tape breakage or in the event of the tape running out in either direction, if the capstan is permitted to continue rotation, with the scanning head bearing against the rubber or other friction surface thereof, the scraping action of the head against the capstan will in time wear or cut a groove in the rubber or other friction lining of the capstan. Such damage to the capstan impairs subsequent operation of the machine, since proper recording and playback requires smooth and accurate interengagement of the recording head with the tape.

The present invention is concerned with automatic mechanism operating to terminate the normal scanning operation whenever the tape runs out, to thereby automatically prevent damage to the friction surface of the capstan. With respect to the use of the expression "tape runs out" hereinafter in this specification and also in the claims, it is to be understood that this is intended to refer not only to actual running out of the tape at the end of a reel but also to tape breakage which will also result in scraping of the scanning head against the capstan, because of the absence of tape riding on the capstan.

In general, the foregoing purpose or object is attained according to the invention by the employment of a feeler for detecting the presence or absence of a tape riding on the capstan, and by the employment of mechanism operated by or tripped by said feeler, to terminate the normal scanning operation, preferably by displacing the scanning head away from the capstan.

In the arrangement of the invention the feeler normally bears against the tape in the region of the capstan but slides thereon because of the relatively low coefficient of friction of the tape, and when the tape runs out, the feeler engages the friction surface of the capstan which, having a much higher coefficient of friction than that of the tape, causes the feeler to be shifted in position in a manner actuating the control mechanism to terminate the scanning.

According to another feature of the invention, the feeler is so arranged that upon engagement with the friction surface of the capstan, and after or substantially concurrently with displacement of the recording head, the feeler itself is also displaced away from the friction surface of the capstan, in order to avoid scoring of the capstan by the feeler.

How the foregoing objects and advantages are attained will appear more fully from the following description referring to the accompanying drawings, in which—

Figure 1 is a plan view, showing certain parts in outline only, of a magnetic tape record handling mechanism of the kind described above and equipped with one form of automatic head kick-out device according to the present invention;

Figure 2 is an enlarged plan view of the capstan shown in Figure 1 and of the recording head and various portions of the automatic head kick-out mechanism;

Figure 3 is a fragmentary view similar to Figure 2 but illustrating a different condition in the operation;

Figure 4 is a view similar to Figure 2 but illustrating still another condition of the parts in the operation of the automatic head kick-out device;

Figure 5 is a fragmentary side elevational view of a portion of the capstan and of the scanning head, with the associated head kick-out mechanism of the kind included in the arrangement of Figures 1 to 4;

Figure 6:
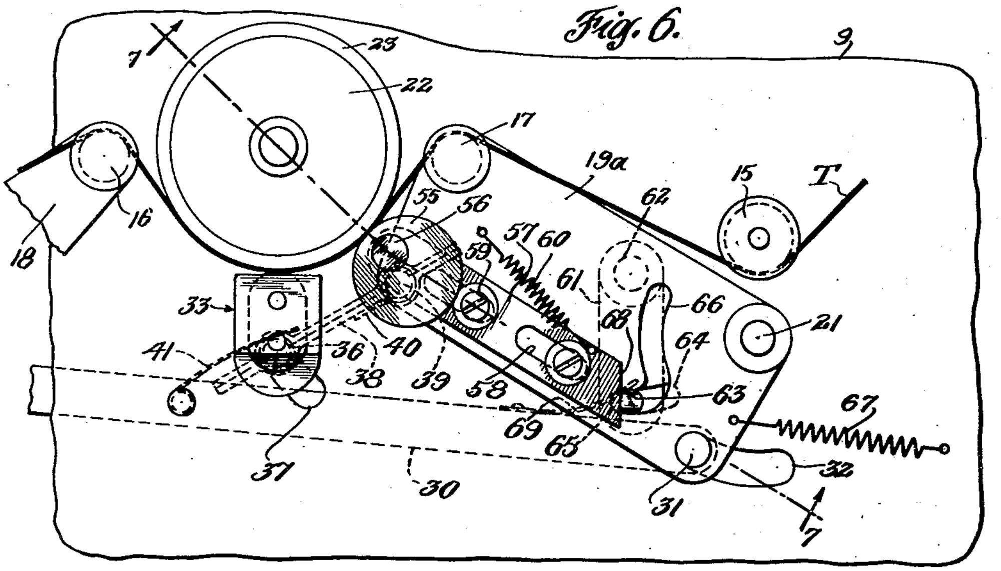
Figure 6 is a plan view of certain parts of the mechanism shown in Figure 1, but illustrating a modification of the invention, the parts in this figure being shown on an enlarged scale as compared with Figure 1.

Referring now to the embodiment of Figures 1 to 5 inclusive, and considering first the general arrangement of the machine as a whole, the various tape handling parts are mounted upon a base plate or supporting board 9. A pair of spaced spindles 10 and 11 project upwardly through the base plate 9 and serve to mount a pair of tape reels indicated in outline at 12 and 13. The tape T is adapted to be fed between the reels in a path defined in part by a pair of fixed guide posts 14 and 15. Additional guide elements 16 and 17 are mounted respectively on arms 18 and 19 which are pivoted at 20 and 21, so that the guides 16 and 17 may be swung toward and away from the tape path between the fixed posts 14 and 15. These parts are shown in Figure 1 with the tape threading arms 18 and 19 and the guide elements 16 and 17 in their inner or normal operating positions in which it will be seen that the guide elements 16 and 17 serve to guide the tape in engagement with an appreciable arc of the tape driving capstan 22. The capstan 22 is surfaced with a layer of friction material 23, preferably made of rubber.

The capstan is mounted on a driving shaft 24 which is adapted to be driven by a transmission and motor mechanism which need not be considered in detail herein since it forms no part of the present invention per se, the same being fully disclosed in applications identified above. It is here mentioned, however, that the capstan drive is reversible, so as to provide for feed of the tape in either direction. It may also be mentioned that the drive mechanism incorporates slip clutches for rotating one or the other of the reel spindles 10 and 11, so as to provide for tape take-up during operation in either direction.

The tape threading arms 18 and 19 are manually controllable by means of a control handle 25 adapted to actuate a double-ended arm 26, one end of this arm being linked as at 27 with a pin 28 which in turn projects upwardly through a slot 29 in the base plate 9, the pin 28 being connected with the arm 18. The other arm of the double-ended lever 26 is pivotally connected with a link 30 extended to the opposite side of the machine for connection with pin 31 which projects upwardly through slot 32 formed in the base plate, the pin 31 being connected with arm 19. Movement of the control lever 25 thus effects concurrent inward and outward swinging movement of the two tape threading arms 18 and 19. A spring 25*a* is arranged with respect to the pivotal axis of the control handle 25 in such manner as to retain the tape threading arms and thus the guides 16 and 17 in either the inner or threaded position or the outer or unthreaded position.

The recording-playback head is generally indicated by the numeral 33. This head includes an electromagnet having a core with pole pieces 34 adapted to engage the tape riding on the capstan 22. The head is mounted on a supporting plate 35 fastened to a supporting post 36 which projects downwardly through a slot 37 in the base plate 9. The post 36 is gripped between a pair of straps 38, which straps also engage a pin 39 acting as a pivot for swinging movement of the head toward and away from the capstan. The pin 39 is further arranged for vertical displacement movement in a manner which need not be described in detail herein, for the purpose of shifting the recording head from one track to the other on the tape, according to which track is being scanned, i. e., according to which direction the tape is being fed. The details of head mounting mechanism of the kind just referred to may be found in the copending application of Chester C. Pond above referred to. The mounting arrangements at the pin 39 still further include a spring, one end of which is indicated at 40 normally urging the recording head to swing toward the capstan.

From the foregoing it will be noted that the head is yieldingly urged against the capstan but is displaceable away from the capstan. Displacement of the head away from the capstan is adapted to be effected by a finger 41 which is carried by and projects from the transverse link 30 of the mechanism for swinging the tape threading arms inwardly and outwardly. When the lever 25 of this mechanism is moved to shift the link 30 toward the right when viewed as in Figure 1, the finger 41 engages the vertical post 36 below the base plate 9 and thereby displaces the recording head outwardly away from the capstan, concurrently with the outward swinging movement of the tape threading arms 18 and 19.

Other features of the general arrangement of the machine include a second control handle 42 comprising the primary manual control for the drive mechanism of the machine, this control having three positions of adjustment one of which provides forward feed of the tape, i. e., in the direction indicated by the arrow F in Figure 1. In another position the drive mechanism is operated to feed the tape in the reverse direction, and the control still further has an intermediate or neutral setting in which the drive mechanism is disabled. The details of the drive control linkages need not be considered herein since they form no part of the present invention and for further details reference may be had to the above mentioned copending applications. The lever 42 also actuates an arm 43 by means of which a link 44 is shifted transversely of the machine, this link having a camming surface (not shown) cooperating with the lower end of the pivot 39 of the head mount, for shifting the vertical position of the head when the drive mechanism is reversed, to thereby provide for tracking of the head in different positions transversely of the tape during the two directions of drive, in the manner which is also fully set out in the above mentioned copending applications.

With the foregoing general features and environment in mind, attention is now directed to the trip or head kick-out mechanism of the present invention. Note first that with the tape threading control 25 in the full line position as shown in Figure 1, the head is urged against the tape riding on the capstan, this scanning condition being maintained regardless of the position of adjustment of the drive control 42. Therefore, if the tape runs out in either direction or if the tape breaks, the scanning head will scrape against the rubber surfacing of the capstan and if this condition continues for an appreciable length of time the capstan will become undesirably scored.

In the arrangement of Figures 1 to 5 inclusive, a pair of feeler members 45 and 46 are employed, these members taking the form of thin rods which project upwardly from mounting arms 47 and 48 which are pivotally connected by pivot pins 49 and 50 disposed below the mounting plate 35 for the head. A double-ended spring wire 51 is positioned to react between the arms 47 and 48, the ends of this spring serving to normally urge the arms outwardly, i. e., away from each other. Outward movement of the arms, in the outer region of such movement is resisted by additional springs 52 and 53, and the forces applied by these several springs are such as to cause the feeler elements 45 and 46 to normally bear against the tape riding on the capstan but to readily slide on the tape because of the low coefficient of friction of the metal surfaces of the feelers bearing against the tape. When the tape runs out with the capstan running, for example, in the direction indicated by the arrow R in Figures 2, 3 and 4, the pole pieces 34 of the head advance against the capstan and the springs 52 and 53 cause the feelers 45 and 46 to engage the rubber surface of the capstan, this condition being illustrated in Figure 3. Because of the high coefficient of friction of the rubber the feeler 45 will "bite" into the rubber and thereby cause the feeler to be swung to the right to the position indicated in Figure 4. From Figure 4 it will be seen that the arm 47 acts in toggle fashion and displaces the head away from the capstan. During this kick-out operation, the feeler 46 will remain inactive, because of the direction of rotation of the capstan; but during rotation of the capstan in the opposite direction, the feeler 46 becomes active and the feeler 45 remains inactive, as will readily be understood from careful examination of Figures 2, 3 and 4.

Attention is now directed to the fact that each of the arms 47 and 48 has an extended rounded end portion projecting inwardly beyond the feelers 45 and 46, as indicated at 47a and 48a. These extremities of the arms 47 and 48 are adapted to engage a rotative member 54 which is fixed to rotate with the capstan (see especially Figure 5). The engagement of the rounded end 47a of arm 47 with the member 54 causes the head to be displaced away from the capstan sufficiently to lift the feeler 45 out of engagement with the driving surface of the capstan. The capstan may therefore continue to rotate without danger of scoring either from the scanning head itself or from the feeler. A corresponding action will occur in the case of feeler 46 when the capstan is rotating in the forward direction, as indicated in Figure 1.

According to the foregoing arrangement, the invention provides for automatic termination of the scanning operation by means of a feeler adapted to detect the presence or absence of a tape riding on the capstan, and this feeler with its associated linkage serves not only to displace the capstan when the tape runs out but also to displace the feeler itself. Damage to the capstan is thereby automatically avoided.

Figures 7, 8:
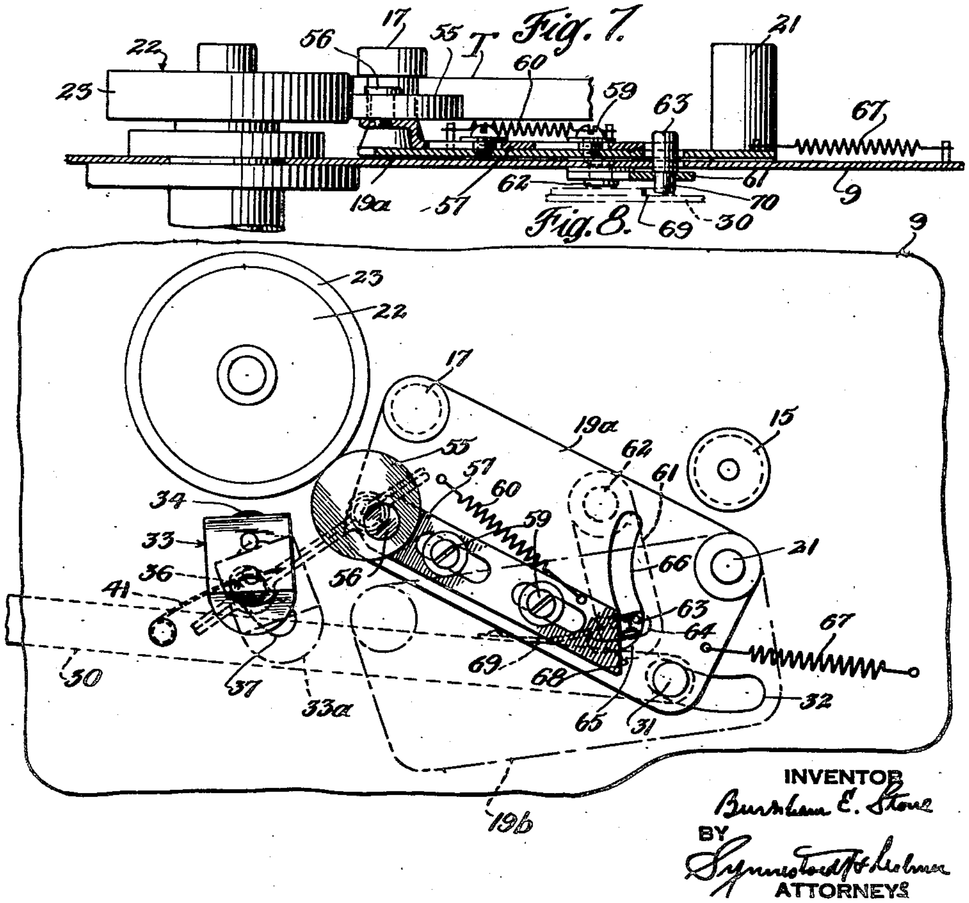
Figure 7 is a sectional view taken substantially as indicated by the section line 7—7 on Figure 6.
Figure 8 is a view similar to Figure 6 but illustrating the parts in a different condition of the operation thereof.

In the modified arrangement as illustrated in Figures 6, 7 and 8, reference numerals have been applied to all parts which are the same as those described above. In the modified arrangement the tape threading arm 19a is of different construction from that shown in Figure 1, although this arm is again pivoted as at 21, is movable by the transverse link 30 and carries the tape guiding element 17.

The feeler in the arrangement of Figures 6 to 8 comprises a disc-like member 55 which is provided with an eccentrically arranged mounting pivot 56 carried by a supporting element 57. The element 57 is provided with elongated apertures such as shown at 58 through which the screws 59 project, the screws being fastened in the threading arm 19a. This arrangement provides for freedom for movement of the element 57 in a direction toward and away from the capstan, and a bias spring 60 is provided normally urging the element 57 and thus the feeler 55 toward the capstan. The strength of spring 60 is sufficient only to lightly engage the feeler 55 with the tape riding on the capstan, so that during the normal scanning operation, the feeler slides on the surface of the tape. However, when the tape runs out with the capstan rotating in either direction, the relatively high coefficient of friction of the rubber surface 23 of the capstan results in eccentric rotation of the feeler 55 and thereby displaces the slide element 57 away from the capstan. In the arrangement of Figures 6 to 8 this motion is utilized to terminate the normal scanning operation in the manner described below.

In a position just beneath the base plate 9 of the machine, a link 61 is pivotally mounted by a pivot 62. The free end of this link carries a pin 63 projecting upwardly therefrom through a slot 64 in the base plate 9 and through another slot formed in the tape threading arm 19a, which latter slot has two interconnected portions, one indicated by the numeral 65 and the other by the numeral 66. The slot 65 has a curvature formed concentric with the mounting pivot 62 of the link 61 and the slot 65 is curved about the axis of pin 21 by which the arm 19a is pivotally mounted.

Attention is now called to the fact that in the arrangement of Figures 6 to 8 a spring 67 acts on the arm 19a to normally urge the arm to swing outwardly, i. e., to the "unthreaded" position. (When employing this arrangement the spring 25a acting on the control handle 25, as shown in Figure 1, is preferably omitted.) The action of spring 67 tending to draw the threading arms 19a (and also the threading arm 18 at the other side of the machine) toward the unthreaded positions is restrained when the pin 63 is engaged in the slot 65, this portion of the slot acting in effect as a latch which retains the threading arms in their inner positions. However, when the pin 63 is shifted to the right when viewed as in Figure 6, for instance to the position shown in Figure 8, the latch, in effect, is released and the spring 67 is at this time effective to swing the tape threading arms to their outer positions.

It is now pointed out that the end of the slide element 67 adjacent to the pin 63 is provided with an angled surface 68 adapted to engage the pin 63 and thereby displace the pin out of its latching position and thus permit the spring 67 to become effective. When this action occurs, the link 30 is shifted transversely to the right and the head lifting finger 41 then acts to displace the head away from the capstan.

The full action above described will be clear from comparison of Figures 6 and 8. In Figure 6 the pin 63 is in the latching position and at this time the recording head 33 is in scanning relation to the tape on the capstan. If the tape runs out, the surface of the feeler 55 engaging the rubber capstan surface causes the feeler to rotate, for instance to the position indicated in Figure 8, thereby forcing the slide element 57 away from the capstan and displacing the pin 63 from its latching position. This initial movement will immediately shift the recording head somewhat away from the capstan as is indicated in full lines in Figure 8, and thereafter further displacement of the recording head will occur because of additional outward swinging movement of the threading arm 19a and the connected link 30, under the influence of spring 67. This outward motion will continue until the threading arms assume the positiion indicated in outline at 19b and in which the recording head assumes the position indicated at 33a. It should be noted that the action described above will occur regardless of the direction of rotation of the capstan 22, since the eccentric feeler 55 will operate in either direction to displace the slide element 57.

Manual release of the latch 63—65 and manual withdrawal of the tape threading arms and of the recording head may also be effected by means of the threading control lever 25 described above in connection with Figure 1. For this purpose a finger 69 is mounted on the transverse link 30 in position to engage a lower projection 70 of the pin 63 (see particularly Figure 7). When the control lever 25 is moved from the full line position shown in Figure 1 to the position for displacing the threading arms, the link 30 is shifted to the right and the finger 69 thus displaces the pin 63, and thereafter the motion of the parts will continue either under the manual influence of the control lever 25 or under the influence of the spring 67.

According to the foregoing provision is made for automatically terminating the normal scanning operation at any time when the tape runs out at the end of a reel or when the tape breaks. Both forms of mechanism provide for the desired automatic action regardless of the direction of rotation of the capstan. Both arrangements further provide for displacement of the feeler element itself away from the capstan at the conclusion of the displacement of the scanning head, so that the capstan is not even scraped by the feeler during continued operation of the capstan drive.

I claim:

1. In a machine for use with magnetic tape records having a tape driving capstan with a tape engaging surface of material having a higher coefficient of friction than that of the tape and further having a magnetic scanning device mounted for movement toward and away from the capstan to engage and disengage a tape riding on said surface of the capstan, mechanism for displacing the head away from the capstan when the tape runs out comprising a head disengaging member mounted for movement toward and away from the capstan, and yielding means normally urging said member toward the capstan, said member further being displaceable by engagement with the surface of the capstan of high frictional coefficient when the tape runs out and thereby displace the scanning head away from the capstan.

2. In a machine for use with magnetic tape records having a tape driving capstan with a tape engaging surface of material having a higher coefficient of friction than that of the tape and further having a magnetic scanning device mounted for movement toward and away from the capstan to engage and disengage a tape riding on said surface of the capstan, mechanism for displacing the head away from the capstan when the tape runs out comprising a feeler normally engaging and readily slidable on a tape riding on the capstan, the feeler being mounted for displacement under the influence of engagement with the capstan surface of high frictional coefficeint when the tape runs out, and linkage for communicating the displacement movement of the feeler to the scanning head in a sense to disengage the scanning head.

3. A construction according to claim 2 in which the capstan is adapted to be driven in either direction and further including two feelers as defined in claim 2 respectively oriented in senses providing for disengagement of the scanning head when the tape runs out with the capstan driven in the two directions.

4. A construction according to claim 2 in which the capstan is adapted to be driven in either direction and in which said feeler is displaceable to disengage the scanning head upon engagement with the capstan when driven in either direction.

5. A construction according to claim 2 and further including mechanism operated by displacement movement of the feeler to disengage the feeler from the capstan.

6. In a machine for use with magnetic tape records having a pair of reels between which a tape is adapted to be fed, a tape driving capstan having a friction surface for engaging the tape in its path of feed between the reels, a magnetic scanning head adapted to yieldingly bear against a tape riding on the capstan but displaceable away from the capstan, and mechanism for effecting head kick-out when the tape runs out comprising a feeler element pivotally mounted on the scanning head and normally bearing against and slidable on a tape riding on the capstan, the feeler being pivotally movable under the influence of engagement with the friction surface of the capstan when the tape runs out, and the feeler pivot being located to provide a toggle action serving to effect head kick-out upon said pivotal movement of the feeler.

7. A construction according to claim 6 and further including mechanism operated by said pivotal movement of the feeler for displacing the feeler away from the capstan.

8. A construction according to claim 6 in which the capstan is adapted to be driven in either direction and further including two feelers as defined in claim 6 respectively pivoted for pivotal movement in opposite directions upon engagement with the friction surface of the capstan when driven in the two directions.

9. In a machine for use with magnetic tape records, a tape driving capstan having a friction surface adapted to engage a tape, a magnetic scanning head adapted to bear against a tape riding on the capstan but being displaceable away from the capstan, mechanism for effecting head kick-out when the tape runs out including a feeler adapted to bear against a tape riding on the capstan, and mechanism operated by engagement of the feeler with the capstan for displacing the feeler away from the capstan.

10. In a machine for use with magnetic tape records, a tape driving capstan having a friction surface adapted to engage a tape, a magnetic scanning head adapted to bear against a tape riding on the capstan but being displaceable away from the capstan, a feeler normally bearing against and slidable on a tape in the region of the capstan but being displaceable away from the capstan, the feeler being movably mounted to provide for engagement thereof with the friction surface of the capstan when the tape runs out and further being shiftable under the influence of engagement with said friction surface, mechanism operated by shifting movement of the feeler for displacing the head away from the capstan, and mechanism also operated by shifting movement of the feeler for displacing the feeler away from the capstan.

11. In a machine for use with magnetic tape records and having a tape driving capstan with a friction surface adapted to engage a tape and a magnetic scanning head adapted to bear against a tape riding on the capstan but being displaceable away from the capstan, a head displacing member movable between a first position in which the head bears against a tape riding on a capstan and a second position in which the head is displaced from the capstan, bias means adapted to shift the head displacing member from said first to said second position, a latch device normally retaining said member in the first position, and a feeler normally bearing against and slidable on a tape in the region of the capstan, the feeler being movably mounted to provide for engagement thereof with the friction surface of the capstan when the tape runs out and further being shiftable under the influence of engagement with said friction surface to trip said latch and thereby provide for displacement of the scanning head under the influence of the bias means.

12. A construction according to claim 11 in which said feeler comprises an eccentrically mounted rotative member.

13. In a machine for use with magnetic tape records and having a tape driving capstan with a friction surface adapted to engage a tape and a magnetic scanning head adapted to bear against a tape riding on the capstan but being displaceable away from the capstan, a head displacing member movable between a first position in which the head bears against a tape riding on a capstan and a second position in which the head is displaced from the capstan, a manual control for moving the head displacing member between said two positions, bias means for shifting the head displacing member from said first to said second position, a latch device normally retaining said member in the first position, and mechanism operated by run-out of a tape to trip said latch and thereby provide for displacement of the head under the influence of the bias means.

14. In a machine for use with magnetic tape records and having a tape driving capstan with a friction surface adapted to engage a tape and a magnetic scanning head adapted to bear against a tape riding on the capstan but being displaceable away from the capstan, a manual control for engaging and displacing the scanning head, a feeler for detecting the presence or absence of a tape riding on the capstan, and mechanism connected with the manual control and operated by the feeler for moving the control to displace the scanning head when the tape runs out.

15. A construction according to claim 14 and further including mechanism for displacing the feeler away from the tape path upon operation thereof to displace the scanning head.

16. In a machine for use with magnetic tape records, a rotative tape driving capstan and a magnetic scanning head normally operating to effect a tape scanning operation in the region where the tape rides on the capstan, a control for establishing and terminating the normal scanning operation comprising a feeler for detecting the presence or absence of a tape riding on the capstan, the feeler normally bearing against and sliding on a tape in the region of the capstan but being engageable with the capstan in the absence of a tape, and mechanism operated by engagement of the feeler with the capstan to actuate the control to terminate the scanning.

BURNHAM E. STONE.

No references cited.